United States Patent [19]

Hansen et al.

[11] Patent Number: 5,038,042

[45] Date of Patent: Aug. 6, 1991

[54] HIGH RESOLUTION SCINTILLATION COUNTERS

[75] Inventors: J. Richard Hansen, Wilkins Twp., Allegheny County; John Bartko, Monroeville, both of Pa.

[73] Assignee: Westinghouse Electric Corp., Pittsburgh, Pa.

[21] Appl. No.: 466,141

[22] Filed: Jan. 16, 1990

[51] Int. Cl.⁵ .............................................. G01T 1/20
[52] U.S. Cl. ................................ 250/368; 250/390.11
[58] Field of Search ............................ 250/368, 390.11

[56] References Cited

U.S. PATENT DOCUMENTS

| | | | |
|---|---|---|---|
| 4,075,483 | 2/1978 | Tancrell et al. | 250/363.06 |
| 4,109,150 | 8/1978 | Martone et al. | 250/368 |
| 4,143,271 | 3/1979 | Klein et al. | 250/368 |
| 4,532,425 | 7/1985 | Abileah et al. | 250/368 |
| 4,743,764 | 5/1988 | Casey et al. | 250/363.03 |
| 4,795,910 | 1/1989 | Henderson et al. | 250/483.1 |
| 4,837,439 | 6/1989 | Genna et al. | 250/368 |
| 4,933,961 | 6/1990 | Rushbrooke et al. | 378/57 |

FOREIGN PATENT DOCUMENTS

| | | | |
|---|---|---|---|
| 0129682 | 1/1985 | European Pat. Off. | 250/368 |
| 0065176 | 5/1980 | Japan | 250/368 |
| 2224353 | 5/1990 | United Kingdom | 250/368 |

Primary Examiner—Constantine Hannaher
Assistant Examiner—Jacob M. Eisenberg
Attorney, Agent, or Firm—W. G. Sutcliff

[57] ABSTRACT

High resolution scintillation counters comprise a flat-faced photomultiplier tube 10 optically coupled to a long scintillator rod 30 having reduced internal light reflectance 45 and a medium 55 between the photomultiplier tube and the scintillator, said medium having both an index of refraction less than that of the scintillator and the capacity to attenuate light traveling from the scintillator to the photomultiplier on the basis of the light's point of origin within the scintillator. In preferred embodiments, the medium comprises air. The scintillation counters disclosed are useful in the detection of electromagnetic radiation, especially gamma rays.

20 Claims, 4 Drawing Sheets

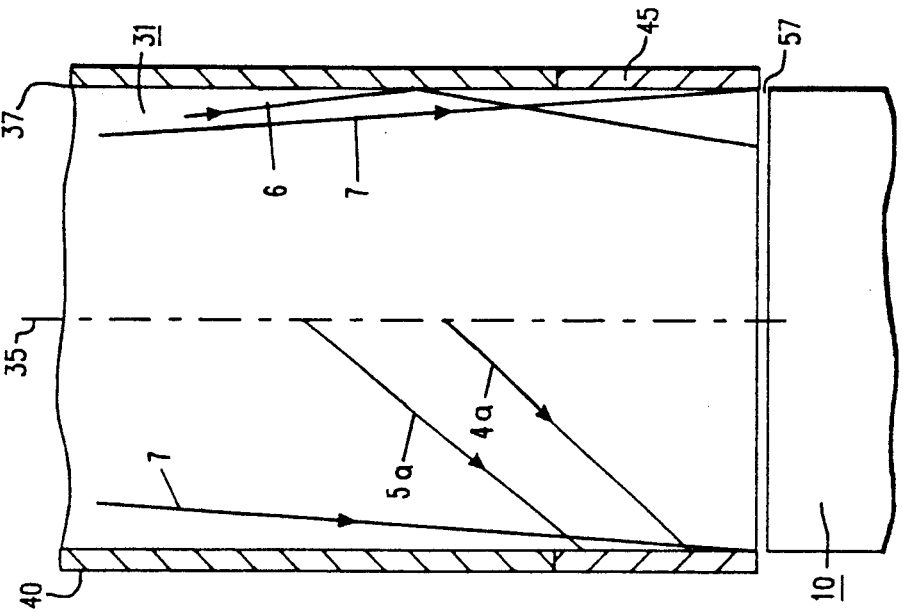
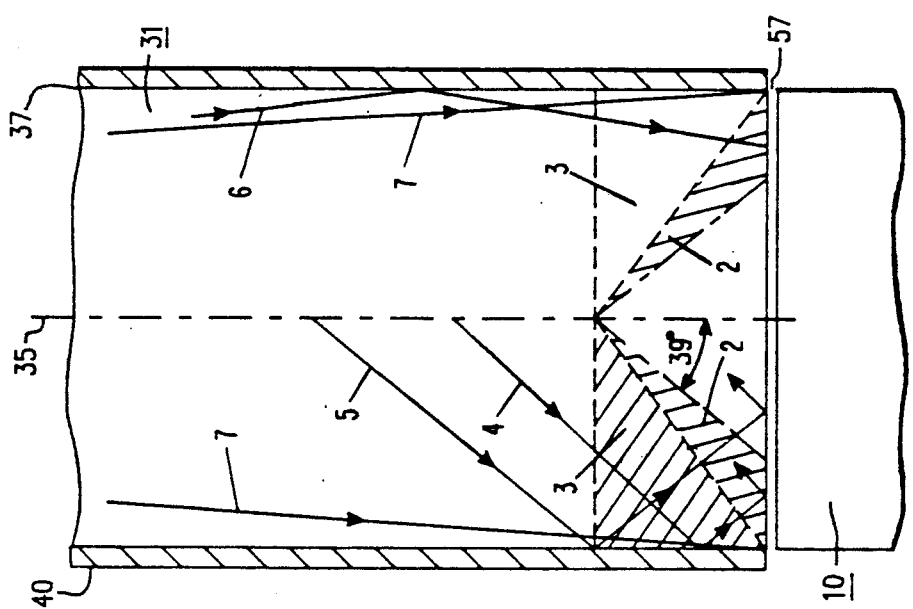

HIGH RESOLUTION SCINTILLATION COUNTERS

GOVERNMENT SUPPORT

Portions of this invention were supported by Department of Transportation Contract FA75WA-3741.

BACKGROUND OF THE INVENTION

This invention relates to high resolution scintillation counters and, more particularly, to techniques for optimizing the energy resolution of plastic scintillation counters capable of detecting gamma rays Scintillation counters are widely used in industry, scientific research, and radiation monitoring. Scintillation counters are useful, for example, in exploring for petroleum and radioactive materials, as well as in the detection of explosive materials, many of which emit gamma rays when activated by neutrons.

The characteristic feature of a scintillation counter is the emission of light flashes by a scintillator contacting certain types of particles and radiation. Charged particles and radiation moving through a scintillator leave a trail of excited atoms which emit characteristic flashes of light. These light flashes are detected by a photosensitive device, usually a photomultiplier tube (also known as a multiplier phototube or PMT). When the sizes of the light flashes are measured in the photomultiplier, the results are commonly recorded in a multichannel pulse-height analyzer (MCA) from which one can determine the energy spectra of the particles and radiation.

One face of a scintillator is commonly placed in optical contact with the photosensitive surface of the PMT. As well known in the art, it is particularly preferred that the light coupling between these surfaces be of as high an order as practicable. See, e.g., J.B. Birks, The Theory and Practice of Scintillation Counting, Chapter 5 (1964). Reflecting material is often placed at the radial surface of the scintillator to direct as much of each light flash as possible to the photosensitive surface Scintillation counters known in the art also commonly employ an optical grease or some other specialized medium between the PMT and the scintillator in order to minimize the reflection back into the scintillator body of light rays traveling to the PMT. Unfortunately, however, such coupling means are quite sensitive to vibration and slight bending forces; thus, great care must typically be exercised in using scintillation counters. The scintillator in a scintillation counter usually comprises transparent crystalline materials, liquids, or plastics In order to function as an efficient detector, the scintillator must be transparent to its own luminescent radiation; since plastic scintillators are often meters in length, such transparency must be of high order.

Scintillators are generally fabricated from inorganic or organic materials. Inorganic scintillators are characterized by the presence of heavy elements Probably the most useful inorganic scintillator is sodium iodide activated with a small amount of thallium salt (NaI(Tl)), which is particularly useful for detecting gamma rays.

Common organic scintillators include naphthalene, anthracene, trans-stilbene, polyvinyltoluene, and a variety of other plastics. Plastic scintillators made from polyvinyltoluene have properties that make them particularly desirable in certain applications. Their fast response and relatively low cost give them significant advantages over more common inorganic detectors For example, by the simple expedient of increasing the length of a polyvinyltoluene detector one can obtain gamma ray detection efficiencies comparable to smaller but considerably more expensive NaI(Tl) detectors Unfortunately, however, increasing the length of these plastic scintillators can also reduce their energy resolution due to the nonuniformity of light energy received at the PMT from different points within a long scintillator. Consider the scintillator 30 of FIG. 1 having a full-length reflecting material 40 on its radial surface 37 and medium 50 resulting in good optical coupling to a PMT tube 10. Two gamma rays—each having energy E—interact with the rod one at point 91 in the scintillator and the other at point 92 Those of skill in the art will appreciate that the associated Compton electron ranges are assumed to be sufficiently short that the light can be considered to originate from points 91 and 92. From this figure it can be seen that the light reaching the end of the scintillator from point 91 will be less than that from point 92 due to the greater energy losses attendant in traveling the added distance from point 91.

This difference can, of course, be minimized by employing low-absorption high-quality scintillation material with an excellent surface finish and a good outer reflecting surface. However, as recognized in the art, some difference will still be maintained between impulses reaching the PMT and energy resolution will suffer. Consequently, it would be of great advantage if some means were available for reducing the intensity difference of detected light signals produced, for example, by gamma rays of the same energy, thus improving energy resolution.

SUMMARY OF THE INVENTION

It is an object of this invention is provide an accurate means of detecting various types of particles and radiation. It is another object of this invention to provide such accurate means of detection using plastic scintillators. It is yet another object of this invention to provide an improved apparatus for detecting gamma rays. It is a further object of this invention to provide long plastic scintillators with optimized energy resolution for the detection of gamma rays such as those emitted by explosive materials.

Accordingly, this invention provides an improved scintillation counter having selective transmitting means which comprises a medium between its scintillator and photomultiplier face plate, said medium having an index of refraction less than that of the scintillator and the capacity to attenuate light travelling to the photomultiplier from a given point within the scintillator to a greater extent than light traveling to the photomultiplier from a more distant point Where scintillation counters known in the art commonly employ an optical grease or some other medium between the PMT and the scintillator in order to minimize the reflection back into the scintillator body of light rays traveling to the PMT, the scintillation counters of this invention comprise between the scintillator rod end and the PMT face a medium which will cause certain of the scintillation light impulses to be reflected back within the scintillator. Such reflection actually enhances the scintillator's energy resolving capacity by equalizing the intensities of light signals received by the PMT regardless of the light's point of origin.

In preferred embodiments, scintillation counters in accordance with this invention also comprise means for reducing the internal reflectance of light rays at the scintillator's radial surface in regions proximate to the photomultiplier tube face plate.

BRIEF DESCRIPTION OF THE DRAWINGS

FIG. 3 is a top plan view of the embodiment of the present invention as indicated by the lines and arrows 1—1 in FIG. 1. FIG. 3 shows the reflection of light rays originating at various points along the scintillator.

FIG. 4 is a top plan view of the embodiment of the present invention as indicated by the lines and arrows 1—1 in FIG. 1, said embodiment having means for reducing the internal reflection of light rays from the scintillator's radial surface. FIG. 4 shows the reflection of light rays originating at various points along the scintillator and means for controlling such reflection.

FIG. 5 shows the reflection of light rays originating at various points along the scintillator and the departure of certain of these rays from the scintillator's radial surface in regions proximate the PMT.

FIG. 6 shows the reflection of light rays originating at various points along the scintillator and the absorption of certain of these rays at the scrintillator's radial surface in regions proximate the PMT.

DESCRIPTION OF THE PREFERRED EMBODIMENTS

Figure 1:
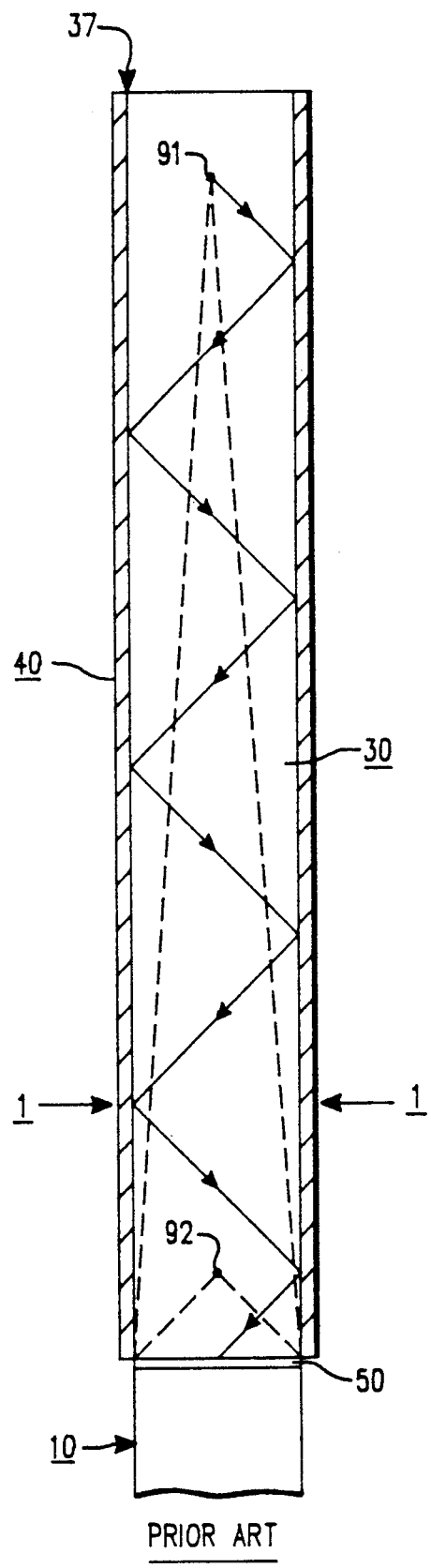
FIG. 1 is a top plan view of a long plastic scintillation counter having full-length reflective coating and a medium between the scintillator and the PMT. The figure shows the reflection of light rays originating at two points along the scintillator.
Figure 2:
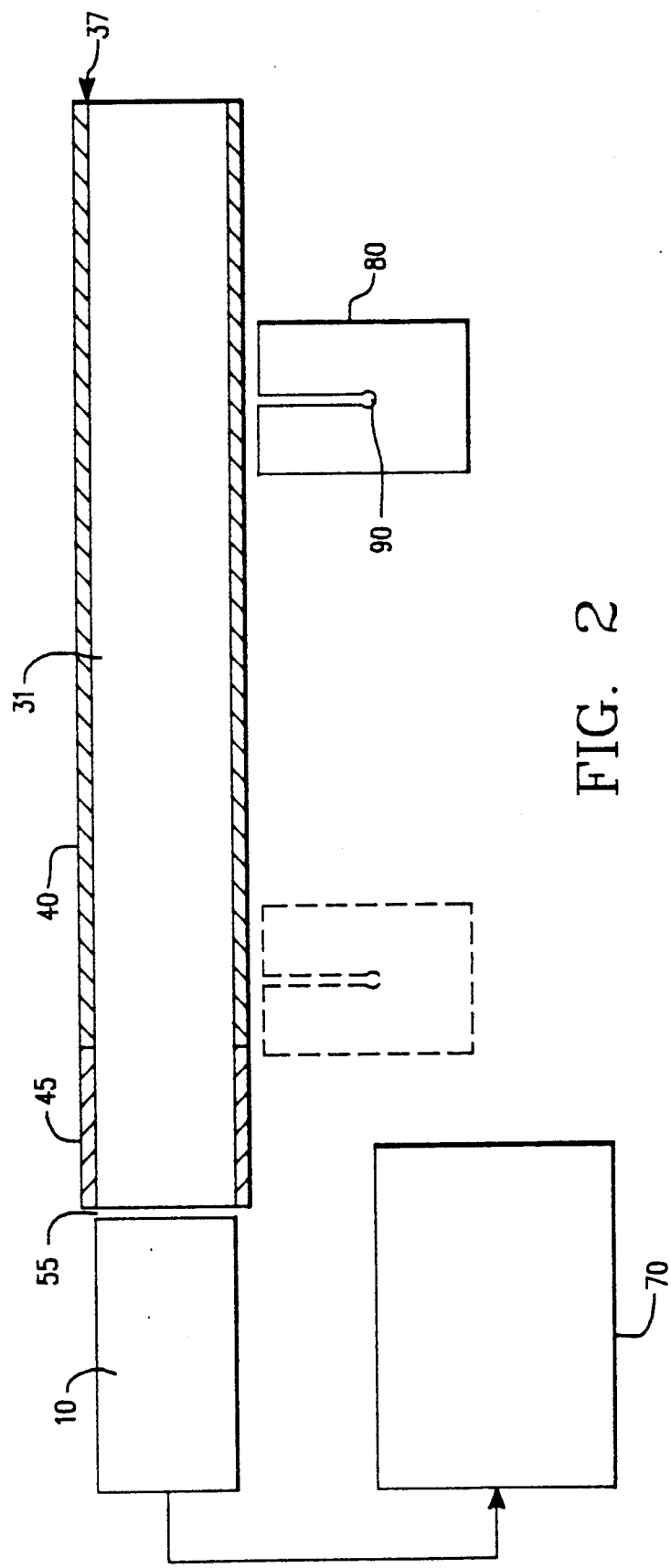
FIG. 2 is a top plan view of an embodiment of this invention illustrating experimental exposure of a scintillator to gamma rays.

As can be seen in FIG. 2, the scintillation counters of this invention comprise a PMT 10 attached to a scintillator 30, with a medium 55 between the photomultiplier tube face plate and the optically coupled end of the scintillator. It is preferred that scintillation counters also comprise a multichannel pulse-height analyzer 70 coupled to the PMT, and means 45 for reducing the internal reflection of light at the radial surface 37 of the scintillator.

FIG. 3 show one embodiment of the present invention, in which several light rays are incident upon the interface of an air medium 57 and a polyvinyltoluene scintillator 31. For such a scintillator, most of the rays originating at points relatively close to the PMT will not travel directly to the PMT, but rather will be reflected As will be appreciated by those of skill in the art, this is so because such rays will have angles to the normal 35 greater than 39°, which is called the critical angle and is Characteristic of the polyvinyltoluene/air interface. Thus, for example, rays originating in the volumes depicted at 2 and 3 will be selectively reflected back into the scintillator and will be considerably attenuated by subsequent reflections before returning Rays such as 4 and 5, which originate at more distant points and have angles greater than 39°, will also be reflected back.

Conversely, for scintillations which originate at even more distant points near the far end of the scintillator, all direct rays and many reflected rays, such as 6 and 7, will pass through the scintillator/medium interface to the PMT unreflected This is because in a long, narrow scintillator the angles of arrival at the interface for all of the direct rays—as well as a significant number of the rays reflected from the side walls—are less than the critical angle.

Thus, the introduction between the PMT and the scintillator of a medium having an index of refraction less than that of the scintillator material has the effect of selectively transmitting light to the PMT by attenuating the intensity of light produced at points close to the PMT face more than that produced at more distant points A wide variety of mediums are capable of effecting reflection at the scintillator interface, so long as they have an index of refraction less than that of the particular material from which the scintillator is fabricated. It is preferred that the medium be air.

As will be apparent to those skilled in the art, the nature and length of the medium employed to enhance the internal reflection of light will depend upon the dimensions of the particular scintillator employed, the nature of materials from which the scintillator is fabricated, and the type of PMT employed It will be recognized by those of skill in the art that certain of the light rays which are initially reflected from the scintillator/medium interface can subsequently be reflected at the radial surface of the scintillator and re-approach the scintillator/medium interface at such angle as to be transmitted to the PMT. Such transmission would serve to diminish the scintillator's energy resolving capacity Accordingly, the scintillation counters of this invention additionally comprise means for reducing the internal reflection of light from the scintillator's radial surface in regions proximate to the PMT. FIG. 4 shows an embodiment of this invention having such means 45. By reducing the internal reflection of light rays from the radial surface 37 of the scintillator near the PMT, rays such as 4a and 5a, which emanate from relatively close scintillations, can be selectively attenuated. As can be seen in FIG. 3, rays originating in volume 3 and rays such as 4 and 5 undergo good reflection at the scintillator's radial surface near the PMT and are received at the PMT face without much loss. Such reflection is due largely to surface reflectors commonly employed in the art as coverings for most scintillators.

Such internal reflection from the scintillator's radial surface can be diminished a number of ways. For example (FIG. 5), the white paper or teflon reflector materials 40 commonly used as reflectors can be applied to all but that portion of the scintillator's radial surface within about 1.5 inches (3.8 cm.) of the PMT; thus, a portion 46 of the scintillator's radial surface will have no reflective material, allowing rays such as 4b and 5b to pass through the scintillator's radial surface. Internal reflection can also be reduced, as in FIG. 6, by darkening that portion 47 of the reflector material at the radial surface of the scintillator and within about 1.0 inches (2.5 cm.) of the PMT with light absorptive substances, such as black ink. Such substances serve to absorb rays such as 4c and 5c. Darkening can also be graduated in absorptivity from the end nearest the PMT up to the appropriate distance.

The extent to which internal reflection is reduced will depend upon the dimensions of the particular scintillator employed, the materials from which the scintillator is fabricated, the nature and length of the medium employed at the scintillator/PMT interface, and the type of PMT employed.

As will be appreciated by those of skilled in the art, a wide variety of organic and inorganic materials can be employed as scintillators in the practice of this invention so long as such materials are highly transparent to electromagnetic radiation, particularly visible light Preferred organic materials include plastics such as naphthalene, anthracene, trans-stilbene, and polyvinyltoluene. It is preferred that plastic scintillators comprise polyvinyltoluene.

The plastic scintillators of this invention should be long, narrow rods—typically several times longer than their respective diameters—in order to give good counting statistics and good spatial resolution of light impulses. It is preferred that plastic scintillators be between about 2.0 inches (5.1 cm.) and about 3.0 inches (7.6 cm.) in diameter by about 15.0 inches (38.1 cm.) in length.

A wide variety of flat-faced photomultiplier tubes well known in the art are amenable to the practice of this invention so long as they have a face area substantially equal to that of the end of the scintillator, a wavelength response matching that of the scintillator's light wavelength, and a short electron output pulse.

The plastic scintillator and photomultiplier tubes of this invention are optically coupled and mechanically attached, as are those well known in the art. However, as contrasted to known devices, attachment and coupling in accordance with this invention produces a mechanically sound instrument having a medium between the scintillator and the PMT with a refractive index less than that of the scintillator. The attachment means of this invention can be of many types, such as masking tape spirally wound along the outer radial surfaces of the scintillator and the PMT or a plastic tubular housing using axial pressure to make a rigid assembly. It is preferred that the scintillator and PMT be attached with rigid plastic tubing which uses axial pressure on the scintillator rod and PMT to both support and align the scintillator rod and PMT.

Additional objects, advantages, and novel features of this invention will become apparent to those skilled in the art upon examination of the following examples thereof.

EXAMPLE 1

A scintillation counter as depicted in FIG. 2 was constructed using a 2.0 inch (5.1 cm.)×15.0 inch (38.1 cm.) rod of polyvinyltoluene (made by Nuclear Enterprises) having a full length reflecting surface. The scintillator was fastened to a flat-faced PMT using spiral-wound masking tape. An air gap approximately 0.25 millimeters in length was created by separating the end of the scintillator from the PMT with three small pads of adhesive tape equally spaced around the periphery of the face of the PMT. The PMT was then electronically coupled to a Tracor Northern multichannel pulse-height analyzer The scintillator was next exposed to lead-collimated collimated $^{60}$Co gamma rays at two different points, as shown in FIG. 2. First, the source-collimator combination 80 was placed along the side of the scintillator about 4.0 inches (10.2 cm.) from the end opposite the PMT. Photomultiplier voltages were adjusted so that the $^{60}$Co Compton peak was centered on channel 60 of the multichannel pulse-height analyzer. The source was then moved about 8.0 inches (20.3 cm.) closer to the PMT end (i.e., about 12.0 inches (30.5 cm.) from the open end) and the shift in the channel was noted.

Typically, the 12.0 inch (30.5 cm.) position showed the peak at channel 68, a spread of eight channels or 12% in pulse amplitude. This can be compared to the spread of at least twenty channels, or 30% pulse amplitude, which is common for detectors made in the conventional manner with good optical coupling The multichannel pulse-height analyzer channel readings of the $^{60}$Co peaks at various source positions along the scintillator rod length are provided below:

| Distance from PMT | | Channel |
|---|---|---|
| inches | cm. | |
| 14 | 35.6 | 40 |
| 12 | 30.5 | 40 |
| 10 | 25.4 | 40 |
| 8 | 20.3 | 40 |
| 6 | 15.2 | 40 |
| 4 | 10.2 | 41.5 |
| 2 | 5.1 | 43 |
| 1 | 2.5 | 44 |

As can be seen, the light intensities were virtually constant from the open end of the rod to a position about 5.0 inches (12.7 cm.) from the PMT, increasing to 110% at the 14.0 inch (35.6 cm.) position. It is this 10% increase in the last 4.0 inches (10.2 cm.) of the rod closest to the PMT that is addressed by that aspect of this invention related to reducing the internal reflectance of light within the portion of the scintillator closest to the PMT.

EXAMPLE 2

Figure 5:
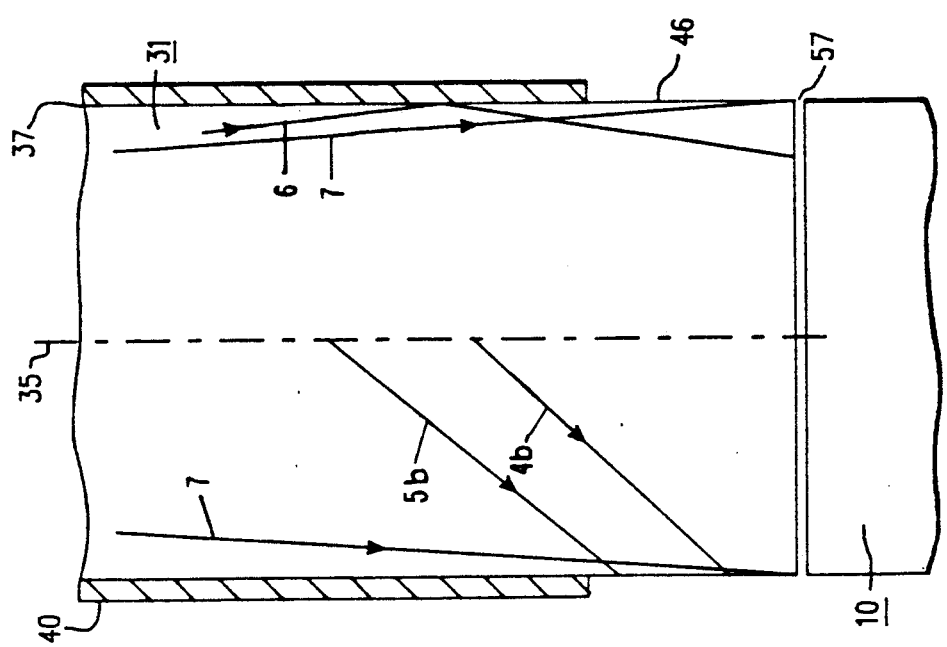
FIG. 5 is a top plan view of the embodiment of the present invention as indicated by the lines and arrows 1—1 in FIG. 1

The experimental technique of Example 1 was followed, except that the scintillator's reflector material was removed within about 1.5 inches (3.8 cm.) of the PMT in the manner shown in FIG. 5.

The multichannel pulse-height analyzer channel readings of the $^{60}$Co peaks at various source positions along the scintillator rod thus modified are provided below and indicate uniform detector response

| Distance from PMT | | Channel |
|---|---|---|
| inches | cm. | |
| 14 | 35.6 | 40 |
| 12 | 30.5 | 40 |
| 10 | 25.4 | 40 |
| 8 | 20.3 | 41 |
| 6 | 15.2 | 41 |
| 4 | 10.2 | 41 |
| 2 | 5.1 | 41 |
| 1 | 2.5 | 41 |

EXAMPLE 3

Figure 6:
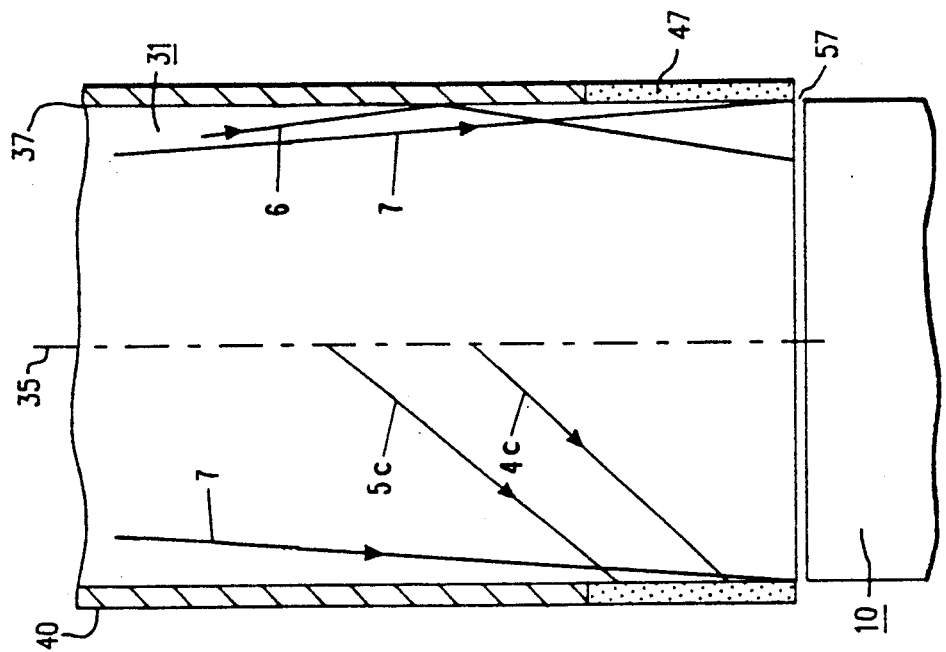
FIG. 6 is a top plan view of the embodiment of the present invention as indicated by the lines and arrows 1—1 in FIG. 1.

The experimental technique of Example 1 was followed, except that the scintillator's reflector material was selectively darkened with black ink 1.0 inches (2.5 cm.) of the PMT in the manner shown in FIG. 6.

The multichannel pulse-height analyzer channel readings of the $^{60}$Co peaks at various source positions along the scintillator rod thus modified are provided below and indicate uniform detector response:

| Distance from PMT | | Channel |
| --- | --- | --- |
| inches | cm. | |
| 14 | 35.6 | 40.5 |
| 12 | 30.5 | 40 |
| 10 | 25.4 | 40 |
| 8 | 20.3 | 40 |
| 6 | 15.2 | 40 |
| 4 | 10.2 | 40 |
| 2 | 5.1 | 40 |
| 1 | 2.5 | 39.5 |

It can thus be seen from Examples 2 and 3 that the implementation of means for reducing the internal reflection of light rays from the scintillator's radial surface in regions proximate to the PMT further enhances the energy resolution of scintillation counters of this invention.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

What is claimed is:

1. A scintillation counter comprising:
   a photomultiplier tube having a face plate;
   a scintillator having one of its two ends optically coupled to the photomultiplier tube face plate and having reflective material upon a portion of its radial surface;
   a medium between the photomultiplier tube face plate and the optically coupled end of the scintillator, said medium having an index of refraction less than that of the scintillator and having the capacity to attenuate light traveling to the photomultiplier from a given point within the scintillator to a greater extent than light traveling to the photomultiplier from a more distant point within the scintillator; and
   means for reducing the internal reflection of light rays at the scintillator's radial surface in regions proximate to the photomultiplier tube face plate.

2. The scintillation counter of claim 1 wherein said medium comprises air.

3. The scintillation counter of claim 1 wherein said scintillator comprises plastic.

4. The scintillation counter of claim 1 wherein said scintillator comprises polyvinyltoluene.

5. The scintillation counter of claim 1 further comprising means for reducing the internal reflection of light rays at the scintillator's radial surface in regions proximate to the photomultiplier tube face plate 6. The scintillation counter of claim 1 wherein said reducing means for reducing internal reflectance comprises reflective material covering that portion of the scintillator's radial surface extending from the end not coupled to the photomultiplier to between about 0.125 inches (0.3 cm.) and about 1.5 inches (3.8 cm.) of the coupled end.

7. The scintillation counter of claim 1 wherein said reducing means comprises light absorptive material at that portion of the scintillator's radial surface between about 0 (zero) inches (0 cm.) and about 1.0 inches (2.5 cm.) of the coupled end in an amount effective to attenuate light traveling to the photomultiplier from a given point within the scintillator to a greater extent than light traveling to the photomultiplier from a more distant point within the scintillator.

8. A scintillation counter comprising:
   a photomultiplier tube having a face plate;
   a scintillator having one of its two ends optically coupled to the photomultiplier tube face plate and having reflective material upon a portion of its radial surface; and
   selective transmitting means for selectively transmitting light travelling from said scintillator to said photomultiplier so that said transmitted light has an energy which is substantially uniform as a function of its point of origin in said photomultiplier, said selective transmitting means comprising means for reducing the internal reflection of light rays at the scintillator's radial surface in regions proximate to the photomultiplier tube face plate.

9. The scintillation counter of claim 8 further comprising a multichannel pulse-height analyzer electronically coupled to said photomultiplier tube.

10. The scintillation counter of claim 8 further comprising means for reducing the internal reflection of light rays at the scintillator's radial surface in regions proximate to the photomultiplier tube face plate.

11. A method of making a scintillation counter comprising the steps of:
    providing a photomultiplier tube having a face plate;
    optically coupling the photomultiplier tube face plate with one end of a scintillator having two ends and having reflective material upon a portion of its radial surface;
    placing between the photomultiplier tube face plate and the coupled end of the scintillator a medium having an index of refraction less than that of the scintillator and having the capacity to attenuate light traveling to the photomultiplier from a given point within the scintillator to a greater extent than light traveling to the photomultiplier from a more distant point within the scintillator; and
    fabricating means for reducing the internal reflection of light rays at the scintillator's radial surface in regions proximate to the photomultiplier tube face plate.

12. The method of claim 11 further comprising electronically coupling said photomultiplier tube with a multichannel pulse-height analyzer.

13. The method of claim 11 comprising placing air between the photomultiplier face plate and the coupled end of the scintillator.

14. The method of claim 11 comprising optically coupling a plastic scintillator to the photomultiplier face plate.

15. The method of claim 11 wherein a scintillator comprising polyvinyltoluene is optically coupled to the photomultiplier face plate.

16. The method of claim 11 wherein said fabricating comprises covering with light reflective material that portion of the scintillator's radial surface extending from the end not coupled to the photomultiplier to between about 0.125 inches (0.3 cm.) and about 1.5 inches (3.8 cm.) of the coupled end.

17. The method of claim 11 wherein said fabricating comprises applying light absorptive material at that portion of the scintillator's radial surface between about 0 (zero) inches (0 cm.) and about 1.0 inches (2.5 cm.) of the end coupled to the photomultiplier in an amount effective to attenuate light traveling to the photomultiplier from a given point within the scintillator to a greater extent than light traveling to the photomultiplier from a more distant point within the scintillator.

18. A scintillation counter comprising:
 a photomultiplier tube having a face plate;
 a rod-shaped scintillator whose length is several times greater than its diameter, having one of its two ends optically coupled to the photomultiplier tube face plate and having reflective material upon a portion of its radial surface; and
 a medium between the photomultiplier tube face plate and the optically coupled end of the scintillator, said medium having an index of refraction less than that of the scintillator and having the capacity to attenuate light traveling to the photomultiplier from a given point within the scintillator to a greater extent than light traveling to the photomultiplier from a more distant point within the scintillator.

19. A scintillation counter comprising:
 a photomultiplier tube having a face plate;
 a rod-shaped scintillator whose length is several times greater than its diameter, having one of its two ends optically coupled to the photomultiplier tube face plate and having reflective material upon a portion of its radial surface; and
 selective transmitting means for selectively transmitting light travelling from said scintillator to said photomultiplier so that said transmitted light has an energy which is substantially uniform as a function of its point of origin in said photomultiplier.

20. A method of making a scintillation counter comprising the steps of:
 providing a photomultiplier tube having a face plate;
 optically coupling the photomultiplier tube face plate with one end of a double-ended, rod-shaped scintillator whose length is several times greater than its diameter and which has reflective material upon a portion of its radial surface; and
 placing between the photomultiplier tube face plate and the coupled end of the scintillator a medium having an index of refraction less than that of the scintillator and having the capacity to attenuate light traveling to the photomultiplier from a given point within the scintillator to a greater extent than light traveling to the photomultiplier from a more distant point within the scintillator.

* * * * *